(12) United States Patent
Seeberger et al.

(10) Patent No.: US 6,354,653 B1
(45) Date of Patent: Mar. 12, 2002

(54) AUTOMOBILE DOOR (75) Inventors: Jürgen Seeberger, Baunach; Gerhard Jürjens, Coburg, both of (DE)

(73) Assignee: Brose Fahrzeugteile GmbH & Co., KG Coburg, Coburg (DE)

( * ) Notice: Subject to any disclaimer, the term of this patent is extended or adjusted under 35 U.S.C. 154(b) by 0 days.

(21) Appl. No.: 09/486,862

(22) PCT Filed: Sep. 4, 1998

(86) PCT No.: PCT/DE98/02698

§ 371 Date: Mar. 4, 2000

§ 102(e) Date: Mar. 4, 2000

(87) PCT Pub. No.: WO99/11491

PCT Pub. Date: Mar. 11, 1999

(30) Foreign Application Priority Data

Sep. 4, 1997 (DE) .......................... 197 38 656

(51) Int. Cl.⁷ .............. B62D 25/04; B60J 5/04
(52) U.S. Cl. .............. 296/146.5; 296/146.1; 296/146.7
(58) Field of Search .......... 296/146.1, 146.2, 296/146.5, 146.7, 152

(56) References Cited

U.S. PATENT DOCUMENTS

| | | | |
|---|---|---|---|
| 4,706,775 A | * 11/1987 | Berg | 296/152 |
| 4,882,842 A | * 11/1989 | Basson et al. | 296/146.1 |
| 4,907,836 A | * 3/1990 | Ueda et al. | 296/152 |
| 5,820,191 A | * 10/1998 | Blakewood, Jr. et al. | 296/146.7 |
| 5,931,682 A | * 8/1999 | Takiguchi et al. | 296/146.7 |
| 6,139,088 A | * 10/2000 | Okamoto et al. | 296/146.6 |

FOREIGN PATENT DOCUMENTS

| | | |
|---|---|---|
| DE | 35 30 413 | 2/1987 |
| DE | 41 26 345 | 10/1992 |
| DE | 41 26 318 | 2/1993 |
| DE | 195 09 282 | 11/1996 |
| EP | 0 131 450 | 1/1985 |
| EP | 0 713 807 | 5/1996 |

OTHER PUBLICATIONS

K. Heberle, "So Schnell wie nötig, so langsam wie möglich", 2087 Elektronik 41 (1992) 15 Sep., No. 19, Munchen, Germany, pp. 78–83 (and English summary).

* cited by examiner

Primary Examiner—Joseph D. Pape
Assistant Examiner—Greg Blankenship
(74) Attorney, Agent, or Firm—Christie, Parker & Hale, LLP (57) ABSTRACT

A vehicle door has a door outside panel and a door inside panel provided with a large surface area cut-out recess which is covered by a support plate in a sealed manner, so that the door body is divided into a wet cell lying between the door outside panel and the support plate, and a dry cell lying between the support plate and an adjoining door inside trim. There are electrical and/or electronic components prefitted on the support plate, and electrical plug connectors which are arranged on the support plate on the dry cell side. Further, switch elements are mounted on the dry cell side of the support plate for manually controlling the electrical and/or electrical components. No electrical connection exists between the switch elements and the door inside trim. At least one of the switch elements provided for manually controlling the electrical and/or electronic components is an electrical, opto-electrical, optical or magnetic structural element which can be brought into active connection with a mechanical operating element assigned to the door inside trim.

13 Claims, 5 Drawing Sheets

Fig. 1

AUTOMOBILE DOOR

FIELD OF THE INVENTION

The invention relates to a vehicle door and a manual operating device for controlling electrical and/or electronic components in a vehicle door.

BACKGROUND OF THE INVENTION

From DE 195 09 282 A1 a vehicle door is known having a modular construction consisting of a door body with a large cut-out recess in the door inside panel, a support plate having several prefitted electrical components and covering the recess, and of a multi-part inside door trim. It is thereby proposed to prefit as many electrical components as possible on the support plate in order to obtain one large unit which can be prechecked, and also to prefit a part of the inside door trim on the support plate. The remaining surfaces which are only covered by further parts of the inside door trim after the support plate has been fitted on the door inside panel are thereby available for fitting the fastening means and producing electrical connections, e.g. for an exit lamp mounted in the inside door trim.

Furthermore, switches for operating the window lifter and the electrical seat adjustment are integrated into a drive and control unit consisting of the electric motor, gearing and electronics. These switches comprise all the electrical contact elements and mechanical operating elements (the user interface components which the user touches) required for controlling the electrical components. Since, however, the user interface which influences the design generally has to be configured differently for each individual use there is a great deal of variation regarding the drive and control unit, which incurs considerable costs in the case of complex structural groups.

SUMMARY OF THE INVENTION

The object of the invention is therefore to develop a vehicle door of the kind mentioned above so that the switches required for manual control and associated with the inside door trim can be adapted to the desired design without increasing the number of variations required for other components, and nevertheless can be prefitted on the support plate so that the requirements are met for obtaining, with the suitably equipped support plate, one precheckable unit with which all the components associated with the door body can be tested.

According to this at least one electrical, opto-electrical, optical or magnetic switch element for manually controlling the electrical and/or electronic components is associated with the support plate and at least one mechanical operating element is associated with the door inside trim. During the manual control, the switch elements associated with the support plate and the operating elements associated with the door inside trim come into active connection with each other. Preferably all the electrical and/or electronic components are prefitted inside the door body on the support plate, which covers the recess in the door inside panel in a sealed manner. The electric plug connectors should be set solely on a dry cell side of the support plate.

It is indeed already known from DE 41 26 318 A1 and DE 41 26 345 C1 to create a switch assembly for motor vehicles from two different structural groups of which one comprises the operating elements and the other comprises the switching elements of the switch assembly. However there is no reference here as to how such a switch assembly can be integrated with particular advantage into a modular vehicle door structure to solve the problem mentioned above. More particularly there is no reference to associating the switch elements with the support plate of a vehicle door and the associated operating elements with the door inside trim of this vehicle door according to the present invention.

It is hereby possible to keep the door inside trim free of any electrical or electronic component and to eliminate the expense connected with the cabling of these components and it is also possible to ensure that all the components provided for each relevant vehicle door can be fully prechecked. Furthermore the number of variations resulting from a different desired design affects only the mechanical operating elements, which are associated with the door inside trim and which, with manual control of the electrical components, come into alternating action with the switch elements associated with the door body. There is thus the possibility of also using standard designs for the manually governed electrical and electronic components (such as window lifter and seat adjustment) if appropriate operating elements having the relevant desired design are offered. Further advantages are: easier assembly and dismantling of the door inside trim, better cost-effective repair possibilities, no excessively long cables compared with the cabling of electrical components in the door inside trim and a reduced number of plug connectors.

In order to engender the switching processes during manual control of the components, switch elements can be used which operate according to different physical principles, e.g. by utilizing electrical, magnetic, optic or opto-electrical effects. Particularly advantageous is a combination of magnets and Hall sensors wherein the magnets are arranged in the mechanical operating elements on the part of the user interface and the Hall sensors are arranged in the switch elements on the base part side (e.g. on a support plate of the door body or on a seat frame). It can thereby be ensured, for example, that no contact is required between the operating elements and the switch elements for the purpose of controlling the electrical or electronic components. A switch device of this kind is insensitive to dirt and not susceptible to tolerances so that the positioning between the mechanical operating elements and the switch elements can be produced in a very simple cost effective manner.

If a displacement is to be controlled or sensed in two directions then a pair of Hall sensors are used which function as switch elements. A magnet, forming a constituent part of a swivel and/or displaceable operating element, is associated with these in a central position. Swivel movement or displacement of the operating element from a neutral position leads to the generation of a signal. After the operator has let go of the operating element, the operating element automatically returns to the neutral position (e.g. through spring force).

According to a preferred variation of the invention the electrical connections between the central control electronics and the electrical or electronic components are designed as individual leads wherein the cabling ought to be produced in conjunction with an automatic ready made cabling device. If it is possible through a favorable positioning of the site of the electrical contact points for the individual components, direct contacting means should be used (e.g. soldering or cut-clamp technology).

By using individual leads and by direct contacting it is possible to achieve considerable savings since no expensive cable tree variations are required and at least a reduced number of plug connectors is needed which not only leads to a reduction in the number of comparatively expensive component parts but also leads to a reduction in the assembly costs.

BRIEF DESCRIPTION OF THE DRAWINGS

The invention will now be explained with reference to an embodiment shown in the drawings in which.

DETAILED DESCRIPTION

Figure 1:
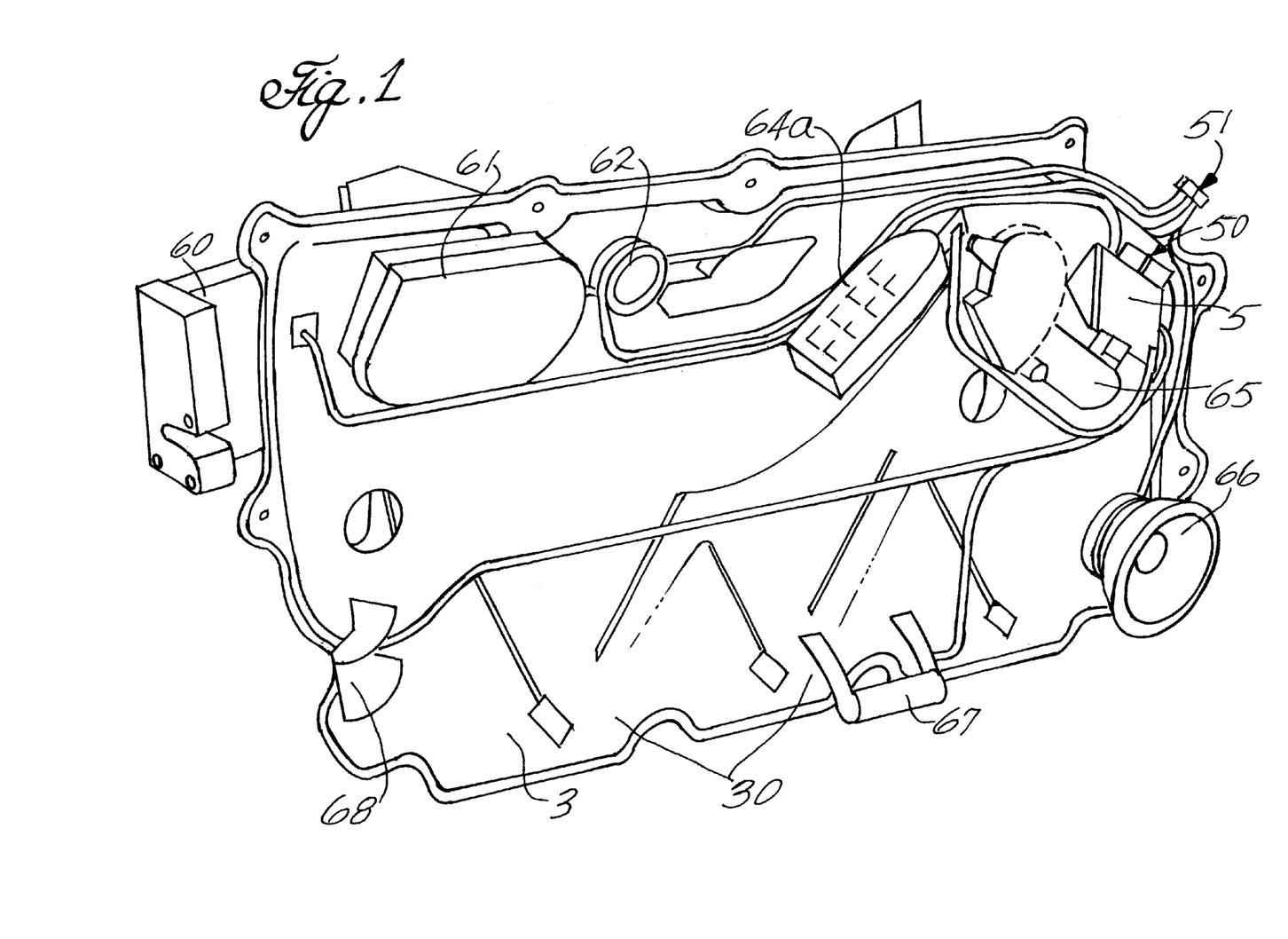
FIG. 1 is a perspective view of a support plate with all the electrical and electronic components associated with the door body, including a switch block with electrical switch elements.
Figure 1A:
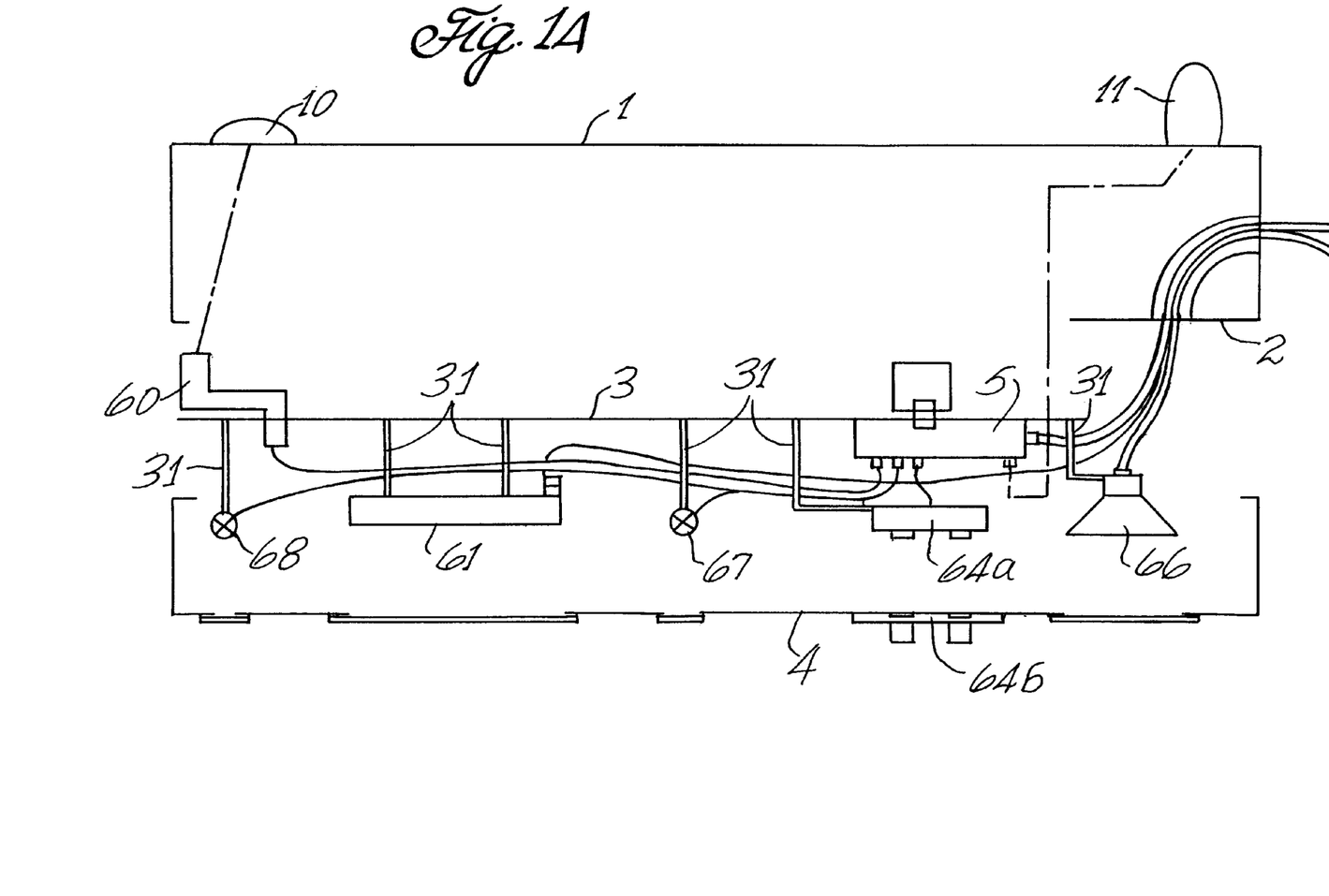
FIG. 1A is a diagrammatic view of a cross-section through the vehicle door, wherein the door body formed by the door outside panel and the door inside panel, the door plate for the electrical and electronic components, as well as the door inside trim are all shown separately from each other.
Figure 2:
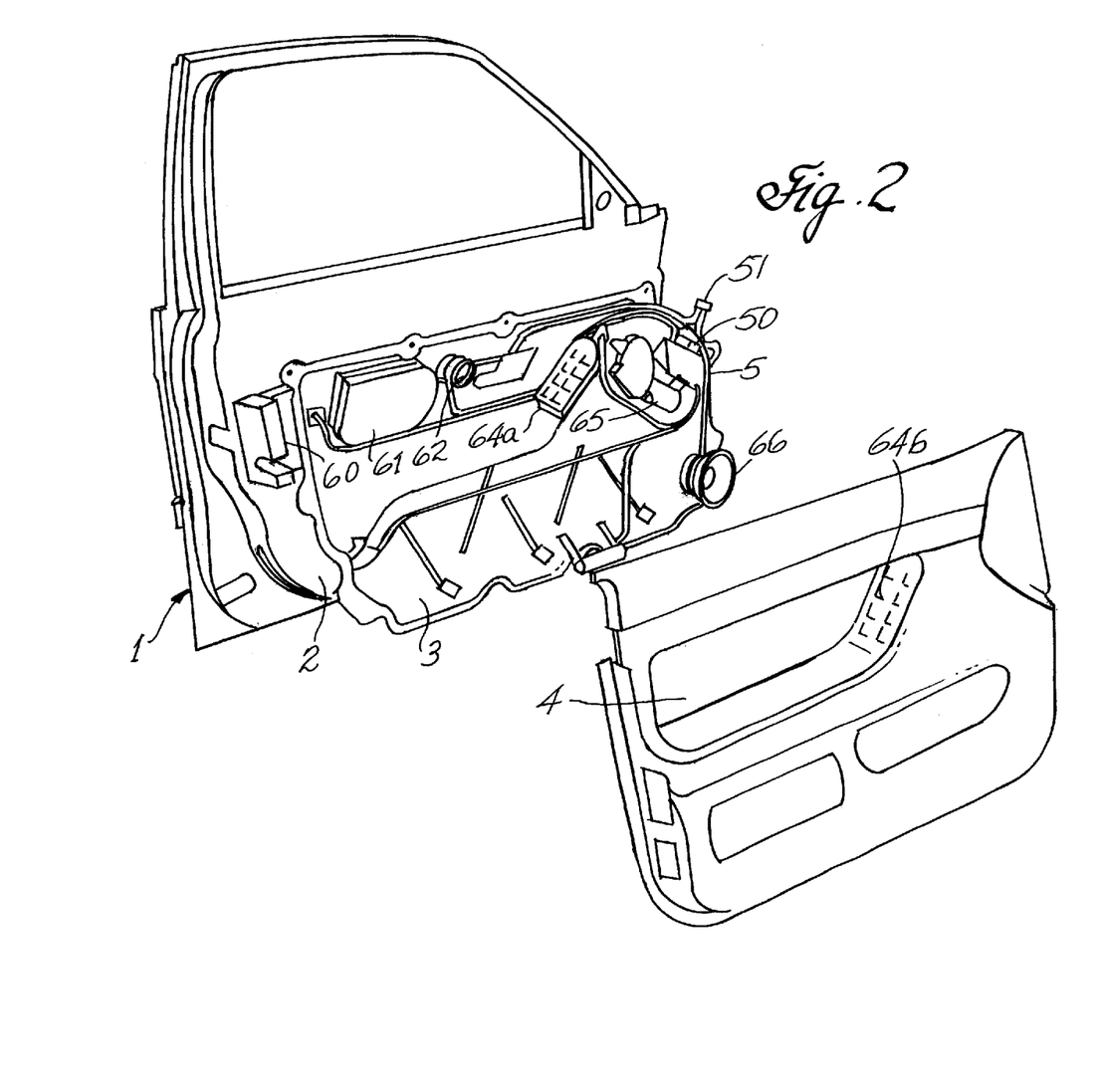
FIG. 2 is a perspective explosive view of a vehicle door, consisting of a door body with a door outside panel and a door inside panel, a support plate with prefitted electrical and electronic components as well as a door inside trim with a block of mechanical operating elements which can enter into active relationship with the electrical switch elements fitted on the support plate.

The embodiment according to FIGS. 1, 1A and 2 shows a vehicle door having a door outside panel 1 and a door inside panel 2 provided with a large-surface cut-out recess. The recess is covered by a support plate 3 in sealed manner so that the door body is divided into a wet cell lying between the door outside panel 1 and support plate 3, and a dry cell lying between the support plate 3 and an adjoining door inside trim 4. All the electrical and/or electronic components 5, 60, 61, 62, 64a, 65, 66, 67, 68 which are associated with the inside space of the door body are prefitted on the support plate 3. Their electrical plug connectors 50, 51 are located solely on the dry cell side.

In order to explain the principle of the invention a diagrammatic sectional view of the vehicle door is shown. From this it can be readily seen that there are no electrical connections belonging to the door inside trim 4. The fastening elements or fastening spots 31 shown as double lines should show that all the electrical and/or electronic components 5, 60, 61, 62, 64a, 65, 66, 67, 68 are fixed on the support plate 3. Some exceptions from these form the external door lock 10 which is connected to the lock 60, and the outside mirror 11 which is attached to the door control unit 5 (or central control electronics). The switch block 64a with the electric (or other type of) switch elements only comes into active connection with the block of the mechanical operating elements 64b after the door inside trim 4 has been fitted.

Figure 3:
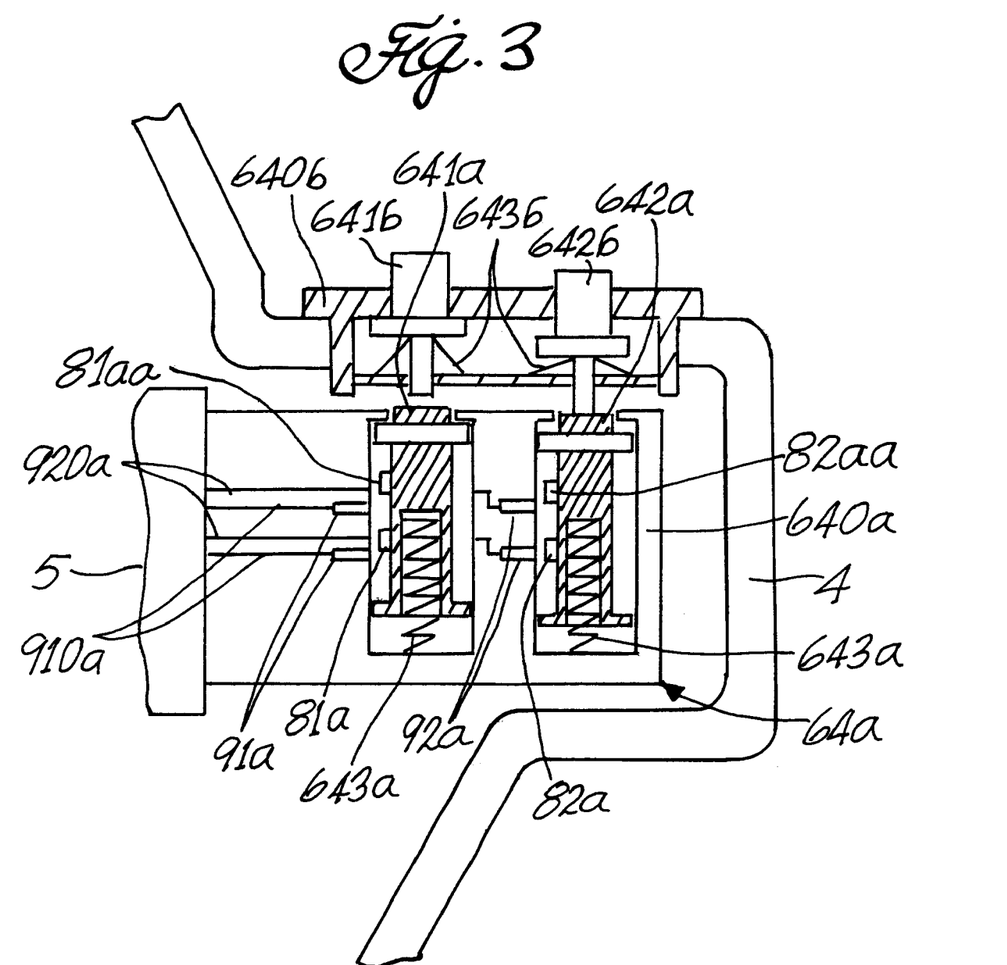
FIG. 3 is a diagrammatic sectional view of a device consisting of switch elements (associated with the support plate) and mechanical operating elements (associated with the door inside trim), for manually controlling components which are prefitted on the support plate.
Figure 4:
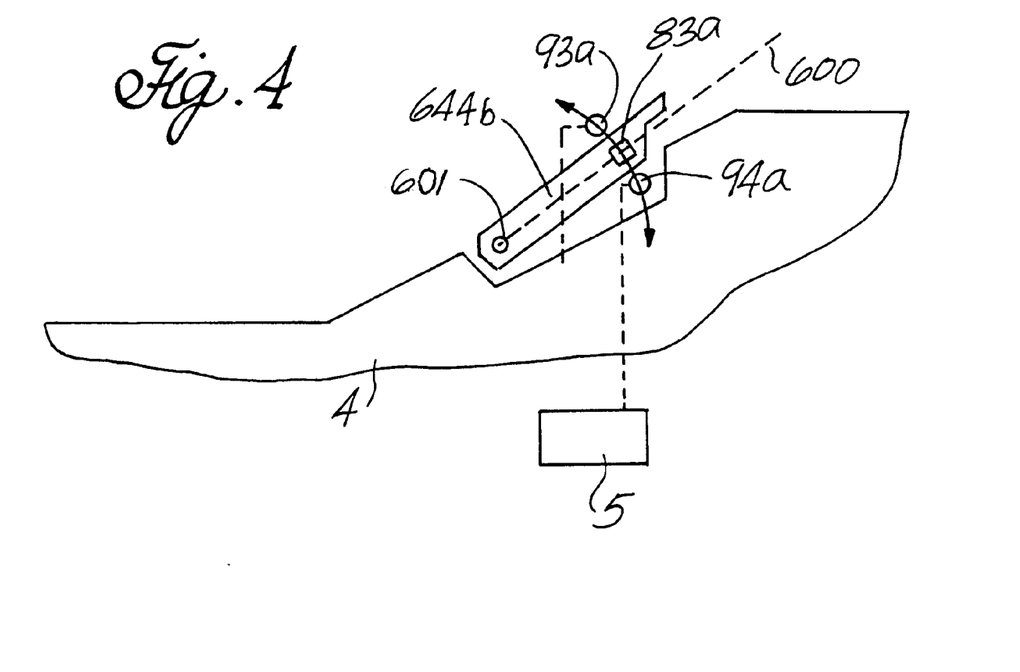
FIG. 4 is a diagrammatic view of a switch device consisting of a pair of stationary Hall sensors and an associated magnet which is connected to a swivel operating element in the form of a push/pull switch.
Figure 5:
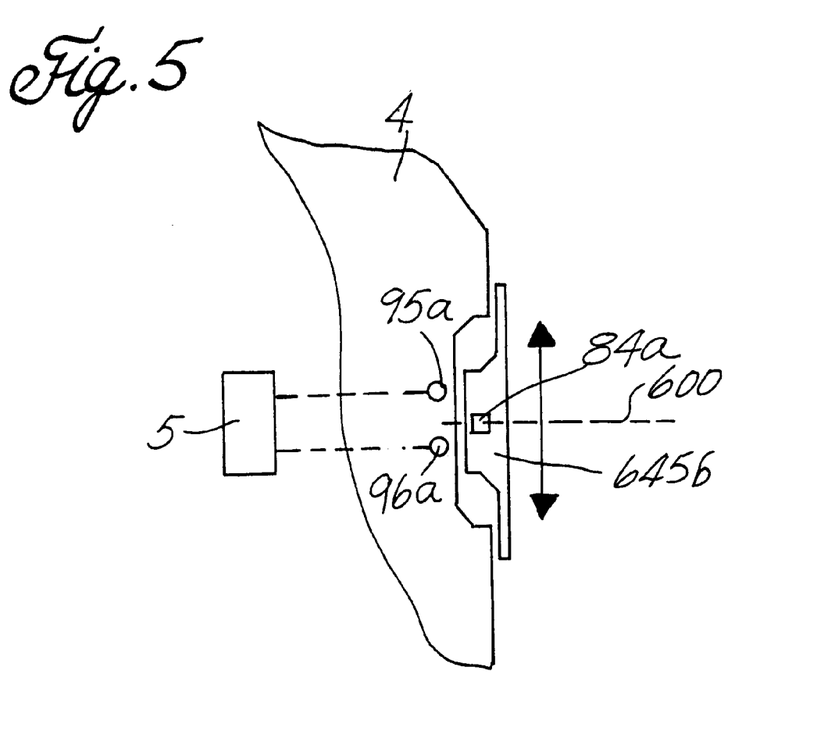
FIG. 5 as FIG. 4, but with an operating element in the form of a sliding switch.

For manually controlling the electrical and/or electronic components 5, 60, 61, 62, 64a, 65, 66, 67, 68 there is at least one electrical, opto-electrical, optical or magnetic switch element 641a, 642a associated with the support plate 3, and at least one mechanical operating element 641b, 642b associated with the door inside trim 4. During manual control the switch elements 641a, 642a associated with the support plate 3, and the operating elements 641b, 642b associated with the inside door trim 4 enter into active connection with each other. FIGS. 3, 4, and 5 show diagrammatic embodiments of manual control wherein the user interface is separable from the actual switch elements.

For the action of other electrical components 61, 62, 66, 67, 68 the adjoining areas of the door inside trim are designed in a suitable way. That is, an ideal break point is assigned for the side airbag 61, sound outlet openings are assigned to the speakers 62, 66 and transparent light outlet areas are assigned to the exit light 67 and warning light 68.

The diagrammatic illustration of the device for controlling electrical and electronic components shows a cut-out recess in the vehicle door in the area of the armrest in which the switches for controlling electrical window lifters are fitted as usual. The housing 640b with the mechanical operating elements 641b, 642b is pushed through an opening in the door inside trim. The mechanical operating elements are designed as press buttons whose upper and lower end position is defined by a flange moulded in the center area. In the rest position, thus without exerting any operating force, the flange of the operating element 641b is pressed by the spring 643b against the upper wall of the housing 640b so that it projects with maximum amount up out from the housing 640b. The pin-like part projecting down from the housing 640b is thereby not in active connection with the switch element 641a underneath. This only happens when by pressing down the operating element 642b its lower pin-like part presses down at least partly the associated switch element 642a, which resiliently adjoins against the upper wall of the housing 640a of the switch block 64a through the spring 643a.

Two spaced coupling elements 81a, 82a are each fitted on the switch elements 641a, 642a and are associated with coupling elements 91a, 92a fitted in the housing. The coupling elements 91a, 92a can use different physical principles. They can, for example, work on the principle of electrical contact switches which close a current circuit on contacting the coupling elements. They can be formed as optical elements (e.g. a combination of mirrors and light conductors) which close or break an optical circuit. Or they can use a combination of magnets which are placed on the switch element 641a, 642a, and associated Hall sensors, magnetic alternating actions to generate switching effects.

According to the embodiment of FIG. 3, a combination of two coupling elements 81a, 81aa, 82a, 82aa was selected for each switch element 641a, 642a wherein the axial spacing of the coupling elements differs from the spacing of the associated coupling elements 91a, 92a on the side of the switch block. It is thereby possible to assign three states to one switch element. The first state corresponds to the neutral position of the switch element 641a without alternating actions occurring between the coupling elements 81a, 81aa, 91a. A second state corresponds to an intermediate position of the switch element 642a in the case of an operating element 642b pressed halfway down wherein the coupling element 82a in connection with the associated coupling element 92a triggers a signal. This intermediate position can be set sufficiently stable through the use of suitable springs and can be designed to be sensed by the user. In order to reach the third state (not shown) the operating element 642b has to be fully depressed so that the coupling element 82aa triggers an additional signal. In the event that a far pressing down of the switch element would be possible, the coupling element 82a would again interrupt the associated circuit and only the signal circuit of the coupling element 82aa would remain closed. This would correspond to a fourth state.

The triggering of the first state of the switch element 641a can be connected, for example, with the option of moving the window pane in the preselected direction only, until the operation is broken off. On the other hand, the triggering of the second state could be connected with moving the window pane into the end position of the proposed direction of movement, even if the operation had already been previously broken off. As an alternative, this state can also be connected to a different, preferably higher, displacement speed of the window pane.

The electric leads 910a, 920a connect the coupling elements 91a, 92a to the control electronics 5 where the generated signals are evaluated and used to control the corresponding electric components. The coupling elements 81a, 81aa, 82a, 82aa on the movable switch elements 641a, 642a are not in connection with electric leads.

A particularly advantageous design of a switch device is shown in the diagrammatic illustration of FIG. 4. According to this, two Hall sensors (or switch elements or echo elements) 93a, 94a are connected to the control electronics and with regard to the door body are fixed underneath the visible surface of the inside door trim 4. To these Hall sensors 93a, 94a is assigned a magnet 83a which is integrated in an operating element 644b which is mounted to swivel about the axis 601. Hall sensors 93a, 94a and the magnet 83a lie, in relation to the swivel axis 601, on the same radius but in parallel planes spaced from each other.

If the operating element 644b is located in the illustrated neutral position 600 then no signal-triggering alternating actions occur between the magnet 83a and the Hall sensors 93a, 94a. If the operating element is swivelled up or down then this leads to signals which control, for example, the window lifter drive in one or other direction. The advantage of this design compared to the widespread so-called rocker switches which trigger both the lowering and the raising of the window pane through pressure operation, lies inter alia in the greater security against faulty operation. Thus, for example, a child leaning out of a half-opened window and kneeling on the operating element 644b can only cause the window pane to be lowered. Injury through jamming is thereby practically eliminated.

The variation shown in FIG. 5 shows a small cut-out section of the vehicle door in a substantially vertical region of the door inside trim using the same technical means as described in FIG. 4. The main difference is in the design of the operating element 645b which has the form of a sliding switch. When displaced from the neutral position 600 up or down, it brings the magnet 84a into the influencing area of one or the other echo elements (or switch elements or Hall sensors) 95a, 96a. The Hall sensors lying underneath the door inside trim form one plane which lies parallel to the displacement plane of the magnet 84a.

LIST OF REFERENCE NUMERALS

| | |
|---|---|
| 1 | Door outside panel |
| 10 | Exterior door handle |
| 11 | Exterior mirror |
| 2 | Door inside panel |

-continued

LIST OF REFERENCE NUMERALS

| | |
|---|---|
| 3 | Support plate/door module |
| 30 | Fastening point |
| 31 | Fastening point/fastening means |
| 4 | Door inside trim |
| 5 | Control electronics/central door control unit |
| 50 | Plug connector |
| 51 | Plug connector |
| 60 | Electric lock |
| 61 | Side airbag |
| 62 | Speaker (mid-range speaker) |
| 63 | Interior door handle |
| 64a | Switch block with electrical switch elements (e.g. for controlling window lifter, exterior mirror, seats) |
| 64b | Block with mechanical operating elements/user interface |
| 65 | Window lifter motor |
| 65a | Gearing |
| 66 | Speaker (Bass speaker) |
| 67 | Exit light |
| 68 | Warning light |
| 600 | Neutral position |
| 601 | Swivel axis |
| 610 | Cover |
| 640a | Housing for switch block with (e.g. electrical or optical) switch elements |
| 640b | Housing with mechanical operating elements |
| 641a | Switch element |
| 641b | Mechanical operating element |
| 642a | Switch element |
| 642b | Mechanical operating element |
| 643a | Spring |
| 643b | Spring |
| 644b | Mechanical operating element/push-pull switch |
| 645b | Mechanical operating element/sliding switch |
| 660 | Cover/speaker grid |
| 670 | Cover/transparent |
| 680 | Cover/transparent |
| 70 | Electric lead |
| 71 | Electric lead |
| 72 | Electric lead |
| 74 | Electric lead |
| 75 | Electrical connection/plug connector |
| 76 | Electric lead |
| 77 | Electric lead |
| 78 | Electric lead |
| 81a | Coupling element, e.g. magnet or mirror |
| 82a | Coupling element, e.g. magnet or mirror |
| 83a | Magnet |
| 84a | Magnet |
| 91a | Coupling element, e.g. echo element or opto coupler |
| 92a | Coupling element, e.g. echo element or opto coupler |
| 93a | Echo element, switch element |
| 94a | Echo element, switch element |
| 95a | Echo element, switch element |
| 96a | Echo element, switch element |
| 910a | Signal lead, e.g. electrical or light conductor |
| 920a | Signal lead, e.g. electrical or light conductor |
| 930a | Signal lead |
| 940a | Signal lead |
| 950a | Signal lead |
| 960a | Signal lead |

What is claimed is:

1. A vehicle door comprising:

a door outside panel;

a door inside trim having a mechanical operating element;

a door inside panel provided with a surface cut-out recess;

a support plate that covers and seals the recess, so that the door is divided into a wet cell lying between the door outside panel and the support plate, and a dry cell lying between the support plate and the door inside trim, wherein the support plate has a dry cell side facing the dry cell;

a plurality of electrical and/or electronic components prefitted on the support plate;

a plurality of electrical plug connectors to provide power to the plurality of electrical and/or electronic components, and which are arranged on the dry cell side of the support plate; and a plurality of switch elements mounted on the dry cell side of the support plate, and used to manually control the plurality of electrical and/or electronic components, wherein one of the plurality of switch elements mounted on the support plate is one of an electrical, opto-electrical, optical, and magnetic structural element, wherein the mechanical operating element is movable between a first position that is not in active connection with the one of the plurality of switch elements and a second position that is in active connection with the one of the plurality of switch elements.

2. The vehicle door according to claim 1 wherein the door inside trim has an opening wherein the mechanical operating element is one of pushed and clipped into the opening in the door inside trim.

3. The vehicle door according to claim 1 wherein the plurality of electrical and/or electronic components and the electrical plug connectors are arranged on the dry cell side of the support plate.

4. The vehicle door according to claim 1 further comprising a central electrical control unit and individual leads that electrically connect the plurality of electrical and/or electronic components and the central electrical control unit.

5. The vehicle door according to claim 4 wherein the individual leads are connected to the central electrical control unit through direct contacting.

6. The vehicle door according to claim 1 wherein the mechanical operating element has a user interface assigned to the door inside trim.

7. The vehicle door according to claim 1 further comprising a central electrical control unit, wherein the plurality of switch elements are optical switch elements and are connected to the central electrical control unit through light wave conductors in order to convert optical signals of the optical switch elements into electrical signals and to evaluate the electrical signals.

8. The vehicle door according to claim 1 wherein the plurality of switch elements are Hall sensors arranged on the support plate, wherein the mechanical operating element has a magnet assigned to the Hall sensors, wherein the Hall sensors generate a control signal in an event of a change in position of the mechanical operating element.

9. The vehicle door according to claim 8 wherein a pair of Hall sensors is assigned to the magnet, wherein the mechanical operating element has a neutral position wherein the magnet is located in a central position between the associated pair of Hall sensors.

10. The vehicle door according to claim 8 wherein the mechanical operating element is formed to swivel about an axis wherein the Hall sensors and the magnet lie on a common radius relative to the swivel axis.

11. The vehicle door according to claim 8 wherein the mechanical operating element has a first position and a second position spaced from the first position, wherein the mechanical operating element is movable alone a path between the first and second positions, wherein the path has a plane that runs parallel to a plane in which the Hall sensors are located.

12. The vehicle door according to claim 1 wherein the operating element is formed for both swivel and displacement movement.

13. The vehicle door according to claim 1 wherein no electrical connection exists between the switch elements and the door inside trim.

* * * * *

UNITED STATES PATENT AND TRADEMARK OFFICE
CERTIFICATE OF CORRECTION

PATENT NO. : 6,354,653 B1
DATED : March 12, 2002
INVENTOR(S) : Jürgen Seeberger and Gerhard Jürjens It is certified that error appears in the above-identified patent and that said Letters Patent is hereby corrected as shown below:

<u>Title page,</u>
Item [86], § 371 Date and § 102(e) Date, replace "Mar. 4, 2000" with -- MAR. 2, 2000 -- (both occurrences).

<u>Column 8,</u>
Line 24, change "alone" to -- along --.

Signed and Sealed this

Fifteenth Day of April, 2003

JAMES E. ROGAN
*Director of the United States Patent and Trademark Office*